(12) United States Patent
Stauffer

(10) Patent No.: US 7,577,710 B2
(45) Date of Patent: Aug. 18, 2009

(54) SYSTEM AND METHOD FOR PRIORITIZING ELECTRONIC MAIL AND CONTROLLING SPAM

(76) Inventor: John E. Stauffer, 6 Pecksland Rd., Greenwich, CT (US) 06831

( * ) Notice: Subject to any disclaimer, the term of this patent is extended or adjusted under 35 U.S.C. 154(b) by 380 days.

(21) Appl. No.: 11/348,369

(22) Filed: Feb. 7, 2006

(65) Prior Publication Data
US 2007/0185963 A1 Aug. 9, 2007

(51) Int. Cl.
G06F 15/16 (2006.01)
G06F 15/173 (2006.01)
H04L 29/06 (2006.01)

(52) U.S. Cl. .................. 709/207; 709/236; 709/240; 713/154

(58) Field of Classification Search .............. 709/201, 709/206, 229, 231, 240, 248; 341/55, 87; 370/8.12, 474; 705/62, 35
See application file for complete search history.

(56) References Cited

U.S. PATENT DOCUMENTS

| | | | | |
|---|---|---|---|---|
| 3,911,404 A * | 10/1975 | O'Neill, Jr. ............... 345/467 |
| 4,750,135 A * | 6/1988 | Boilen .................... 709/231 |
| 4,752,765 A * | 6/1988 | Larson .................... 341/55 |
| 4,929,946 A * | 5/1990 | O'Brien et al. ........... 341/87 |
| 5,293,379 A * | 3/1994 | Carr ...................... 370/474 |
| 5,923,845 A * | 7/1999 | Kamiya et al. ........... 709/206 |
| 6,421,709 B1 * | 7/2002 | McCormick et al. ....... 709/206 |
| 6,591,301 B1 * | 7/2003 | Li et al. ................. 709/229 |
| 7,287,097 B1 * | 10/2007 | Friend et al. ............. 709/248 |
| 7,383,212 B1 * | 6/2008 | Cleveland et al. ......... 705/35 |
| 2002/0188659 A1 * | 12/2002 | Ohashi et al. ............ 709/201 |
| 2004/0086094 A1 * | 5/2004 | Bosik et al. ............. 379/88.12 |
| 2004/0128254 A1 * | 7/2004 | Pintsov .................. 705/62 |
| 2004/0177118 A1 * | 9/2004 | Mason et al. ............. 709/206 |
| 2005/0193073 A1 * | 9/2005 | Mehr et al. .............. 709/206 |
| 2005/0271282 A1 * | 12/2005 | Reckers .................. 382/229 |
| 2006/0026298 A1 * | 2/2006 | Zeng et al. .............. 709/240 |

* cited by examiner

Primary Examiner—Ario Etienne
Assistant Examiner—Tae K Kim
(74) Attorney, Agent, or Firm—Patton Boggs LLP

(57) ABSTRACT

The present system and method for prioritizing email and controlling spam provides capability to determine the priority of emails received by an addressee. Such emails are designed to alert an addressee of its priority by the number of times the characters of the email address of the addressee are repeated. The present system and method include a coder/decoder that repeats the characters of an addressee's email address to reflect the priority of the email address assigned by the sender prior to sending the email over a network. The coder/decoder is embodied in software or instructions that are run on an email client or email server that count the number of times these characters are repeated. The greater number of repetitions, the greater the priority of the email.

22 Claims, 4 Drawing Sheets

SYSTEM AND METHOD FOR PRIORITIZING ELECTRONIC MAIL AND CONTROLLING SPAM

FIELD OF THE INVENTION

The present invention relates to computer systems, and more particularly to a system and methods for prioritizing electronic mail and controlling spam.

PROBLEM

With the advent of the computer, electronic mail ("email") has become a favored mode of communication among its users. Email is mail that is composed and transmitted on a computer system or network. Some of the many benefits of using email are instantaneous delivery, de minimis transmission expense, and the ability to send to a plurality of addressees in one transmission. Nonetheless, this last benefit is a double-edged sword; the other edge being that a sender may transmit mass quantities of unsolicited or junk email ("spam"), such as advertisements or irrelevant messages, to addressees with little expense. The senders of spam realize that only a small percentage of the total addressees will visit their website, but that the total number of replies will be substantial due to the sheer mass quantity of spam transmitted. Additionally, spam has become more threatening to computer users with the so-called phishing attacks—fake emails that look like they are from people or institutions you trust but that are actually sent by crooks to steal a user's credit card information or other personal information. It has been estimated that spam accounts for more than two thirds of all email transmitted over the internet—accounting for billions of unwanted messages every day.

Many attempts have been made to stop or control the receipt of spam from being received in a computer user's email inbox. Some of the earlier attempts to control spam involved fingerprint-matching techniques. These techniques involved locating known spam and then using a computer to "fingerprint" the spam. This is done by identifying certain characteristics of the content of known spam and calculating a "fingerprint" number for the spam and then filtering or controlling subsequent incoming emails that have similar fingerprint numbers. These fingerprints could be derived by using a simplified mathematical expression in combination with certain characters or letters found in known spam to generate a fingerprint. To counteract these spam filters, spammers added additional random characters to their emails to give it a different fingerprint that would not be detected or filtered by the existing fingerprint-matching techniques.

Another approach to controlling spam is to utilize machine-learning capabilities. In these methods, algorithms are used, such as the Naïve Bayes algorithm, to identify and distinguish spam from valid email. These algorithms search for the presence or absence of certain words or combinations of words, such as "click," "money," "here," and "unsubscribe." Probabilities are assigned to emails based on these algorithms, and those emails that matched a certain probability are filtered. Spammers thwarted these efforts by using non-letter characters in these selected words, such as using a zero in place of an "o" in the word "money."

Another approach to controlling spam requires an email sender to pay for each email they send. This payment is in an electronic format, such as an electronic check or bond, so that if the email message is accepted by the addressee, the check is not cashed, but if the email is rejected by the addressee, then the check is cashed and donated to some organization. Nonetheless, these monetary systems will be difficult to put into practice and will require additional costs associated with the overhead of implementing and running the system.

Yet another approach to controlling spam utilizes a service that establishes and maintains a database of email addresses. Users join or subscribe to the service and notify the service if they receive spam. The service in turn notifies the other users in the service of the spam event. The service notifies the spammer to remove the addresses of its users from the spammer's addresses. This service can ultimately be thwarted by spammers because of the ease that they can change their email addresses.

Information relevant to attempts to address these problems can be found in U.S. Pat. No. 6,697,462 issued 24 Feb. 2004 to Raymond; U.S. Pat. No. 6,868,498 issued 15 Mar. 2005 to Katsikas; U.S. Pat. No. 6,546,416 issued 8 Apr. 2003 to Kirsch; U.S. Pat. No. 6,484,197 issued 19 Nov. 2002 to Donohue; U.S. Pat. No. 6,615,242 issued 2 Sep. 2003 to Riemers; U.S. Pat. No. 6,915,334 issued 5 Jul. 2005 to Hall; and U.S. Pat. App. Nos. US2005/0165892 to Kelly filed 8 Jan. 2004; US2005/0198518 to Kogan et al. filed 20 Jan. 2004; and US2005/0204159 to Davis et al. filed 15 Sep. 2005. Therefore, there is a need for a system that prioritizes emails and controls the receipt of spam by a user.

SOLUTION

The above described problems are solved and a technical advance achieved by the present system and method for prioritizing email and controlling spam. The present system and method for prioritizing email and controlling spam provides capability to determine the priority of emails received by an addressee. Such emails are designed to alert an addressee of its priority by the number of times the characters of the email address of the addressee are repeated. The present system and method are embodied in software or instructions that are run on an email client or email server that count the number of times these characters are repeated. The greater number of repetitions, the greater the priority of the email.

The present system and method for prioritizing email and controlling spam are capable of coding an email address by repeating the characters in an email address. A character of an email address is repeated a number of times before the subsequent character in the email address is repeated.

The system also decodes the email address and determines the priority of the email to the addressee or recipient. When a recipient or addressee receives an email coded in this manner, the system compares the first character of the received email address with the first character of the stored address in the recipient's or addressee's stored list of email addresses. If the characters are identical the system compares the second character of the received email address with the first character of the addressee's stored list of email address. This process is repeated until there is a difference between characters of the two email addresses. When a difference is found, the different character of the received email address is compared to the next letter in the stored email address. The process is repeated until all the characters of the received email address have been compared. The frequency of the repetitions of each character of the received email address that corresponds to the stored email address indicates the relative priority attached to the email by the sender. The systems also includes a separate inbox for receiving these prioritized emails.

An email message coded according to the system and method described herein will be rejected by the email server of the domain name of the addressee. Once it is rejected, the system will accept the coded email message and will decode the message and assign a priority to the email message. Then the email will be placed in an inbox that accepts such prioritized emails. The system will reject spam messages.

SUMMARY

The present system and method for prioritizing email and controlling spam provides capability to determine the priority of emails received by an addressee. Such emails are designed to alert an addressee of its priority by the number of times the characters of the email address of the addressee are repeated. The present system and method include a coder/decoder that repeats the characters of an addressee's email address to reflect the priority of the email address assigned by the sender prior to sending the email over a network. The present system and method are embodied in software or instructions that are run on an email client or email server that count the number of times these characters are repeated. The greater number of repetitions, the greater the priority of the email.

DETAILED DESCRIPTION OF THE DRAWINGS

Typically, an email address is made up of several parts, such as a user name, domain name, and general. The user name is the name or pseudo name of the addressee, such as "johndoe." The domain name is the provider or internet service provider ("ISP") of the simple mail transfer protocol ("SMTP") server, such as "aol" for America Online®. The general is the top level extension at the end of the email address, such as ".com," ".net," ".org," and ".gov." The "@" symbol separates the user name and the domain name, so for example, an email address could be "johndoe@aol.com."

Figure 1:
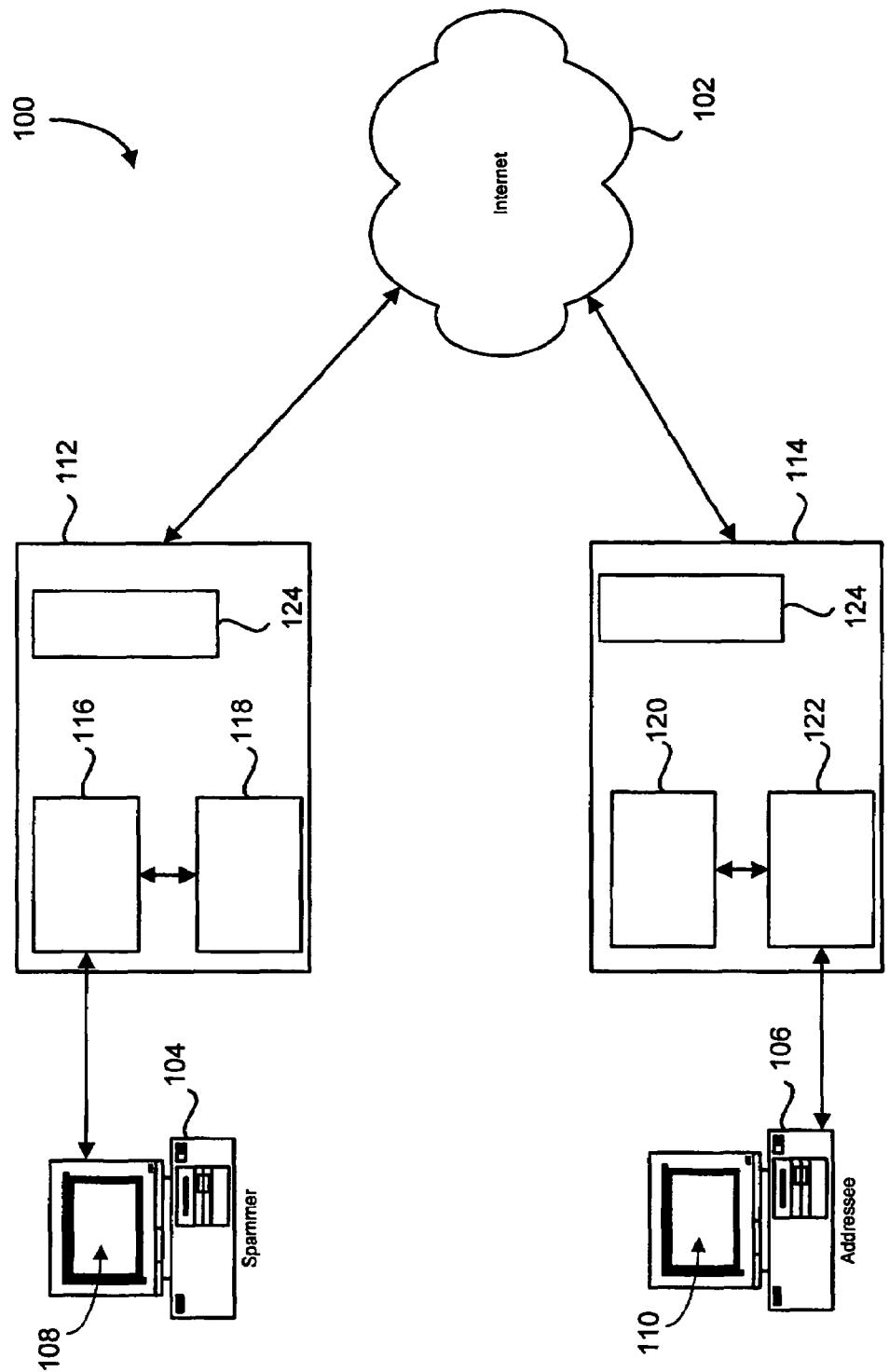
FIG. 1 illustrates an embodiment of the present system for prioritizing email and controlling spam.

FIG. 1 is a block diagram of an embodiment of a standard email system for sending and receiving email on the Internet and is used to explain the present system for prioritizing email and controlling spam 100. The standard email system follows a standard industry protocol for handling email on the Internet, referred to as SMTP. SMTP is a Transmission Control Protocol/Internet Protocol ("TCP/IP") protocol for sending email between servers. Virtually all email systems that send email over the Internet use SMTP. Typically, an email is sent via SMTP to a POP3 (Post Office Protocol) server ("email server") where an addressee retrieves the email. Because of SMTP and POP3, an addressee specifies both the POP3 server and SMTP server when they set up their email account using their email client application, such as Microsoft® Outlook®, Eudora®, Pegasus, etc. An email client is generally a software application that is run on a sender's or spammer's computer 104 and an addressee's computer 106 that displays text and menus on the monitor of the computers 104 and 106. The email client application 108 and 110 generally resides on the local drive or memory of the computers 104 and 106. Among other email functions, the email clients 108 and 110 generally display to a user or addressee all of the messages that are in their inbox, by displaying message headers that include the sender of the email, subject of the email, and the time and date that the email was sent. The email clients 108 and 110 also allow the user or addressee to create new messages and send them to other users or addressees. Thus, for purposes of the present system for prioritizing email and controlling spam 100, an email client 108 and 110 will be considered part of the sender's or spammer's computer 104 and addressee's computer 106, shown as email clients 108 and 110 respectively.

In FIG. 1 is shown two separate email servers, a sender or spammer's email server 112 and an addressee's email server 114. Typically, email servers 112 and 114 are used to handle the email service functions. For example, email servers 112 and 114 connect to the email clients 108 and 110 to send and receive email. Typically SMTP servers are for handling the outgoing mail, and POP3 or Internet Mail Access Protocol ("IMAP") servers are for handling the incoming email. In FIG. 1 is shown a sender's or spammer's SMTP server 116 and POP3 server 118 and an addressee's SMTP server 120 and POP3 server 122. In general, both the sender's or spammer's SMTP server 116 and the POP3 server 118 operate together to make up the sender's or spammer's email server 112. Likewise, the addressee's SMTP server 120 and POP3 server 122 operate together to make up the addressee's email server 114.

When a user subscribes to an ISP, they usually also gain access to that ISP's SMTP server. Users access the Internet 102 through their ISP using a dialup or high-speed line connection and a standard browser, such as Internet Explorer® or Netscape®. ISPs typically have one or more SMTP servers. SMTP servers 116 and 120 generally interact with email clients 108 and 110, respectively, to send email from a sender to an addressee. The ISP operates at a website address corresponding to its domain name which is addressable by users on the Internet 102. The ISP's service functions are performed for a large number of subscribers through one or more servers. The ISP or host SMTP server may interact with other SMTP servers over the Internet 102 when sending emails. When a user or spammer sets up an email account with their ISP, they set their email client 108 to the name of the ISP mail server 112, such as "spammer.zzz.com." When a spammer sends spam to an addressee, the spammer's email client 108, which resides on the spammer's computer 104, typically communicates with their ISP's SMTP server 116 telling the SMTP server 116 the email address of the spammer, the address of the addressee, and the body of the spam in addition to other information. The spammer's SMTP server 116 breaks down the addressee's address into the addressee's user name and the domain name. If the addressee's user name is a member of the same ISP or domain name, email server 112, as the spammer's, the SMTP server 116 will send the spam to the POP3 server 118 located at the ISP for delivery to the addressee. If the addressee is not a member of the spammer's SMTP server 116, then the spammer's SMTP server 116 will need to communicate with another SMTP server 120, email server 114, via the Internet 102, at the addressee's ISP or domain name.

This communication involves the spammer's SMTP server 116 inquiring at the Domain Name Server ("DNS") for the Internet Protocol address ("IP address") for the SMTP server for the domain, for example "yyy.com," of the addressee. The DNS returns to the spammer's SMTP server 116 with the IP address of one or more SMTP servers 120 for the domain name "yyy.com" of the addressee. The spammer's SMTP server 116 then connects with the SMTP server 120 for the addressee and inquires whether the IP address of the addressee is at the SMTP server 120 for the addressee. If the addressee's IP address is at the addressee's SMTP server 120, then the spammer's SMTP server 116 transmits the spam message to the addressee's domain name or email server 114, which is then transmitted to the addressee's POP3 server 122, which puts the message in the inbox of the addressee's email client 110.

To receive the spam, the addressee logs into their POP3 server 122 from their email client 110 that resides on their local computer 106 and issues a series of commands to the addressee's POP3 server 122. The POP3 server 122 then opens the spam text file and transmits the spam to the addressee's local computer 106. Generally, the POP3 server 122 acts as an interface between the addressee's email server 114 and their email client 110. After transmitting the spam to the addressee's email client 110, the spam is deleted from the addressee's POP3 server 122. The above relating to POP3 servers can also be employed on an IMAP server as well. An IMAP server holds or stores the spam or email instead of deleting it so that it can be accessed later. Email servers 112 and 114 also typically employ queues for holding email and spam that is not able to be transmitted instantly due to a problem or connection with other SMTPs over the Internet.

The present system for prioritizing email and controlling spam 100 further includes a receiver coder/decoder, preferably in the form of instructions or software, that resides on both the user's or spammer's email server 112 and the addressee's email server 114. The coder/decoder 124 may also operate on the user's or spammer's computer 104 and the addressee's computer 106 in conjunction with the user's or spammer's email client 108 and the addresee's email client 106. Further, the coder/decoder 124 may include hardware, computer readable memory, or both, for storing the prioritized emails.

Figure 2:
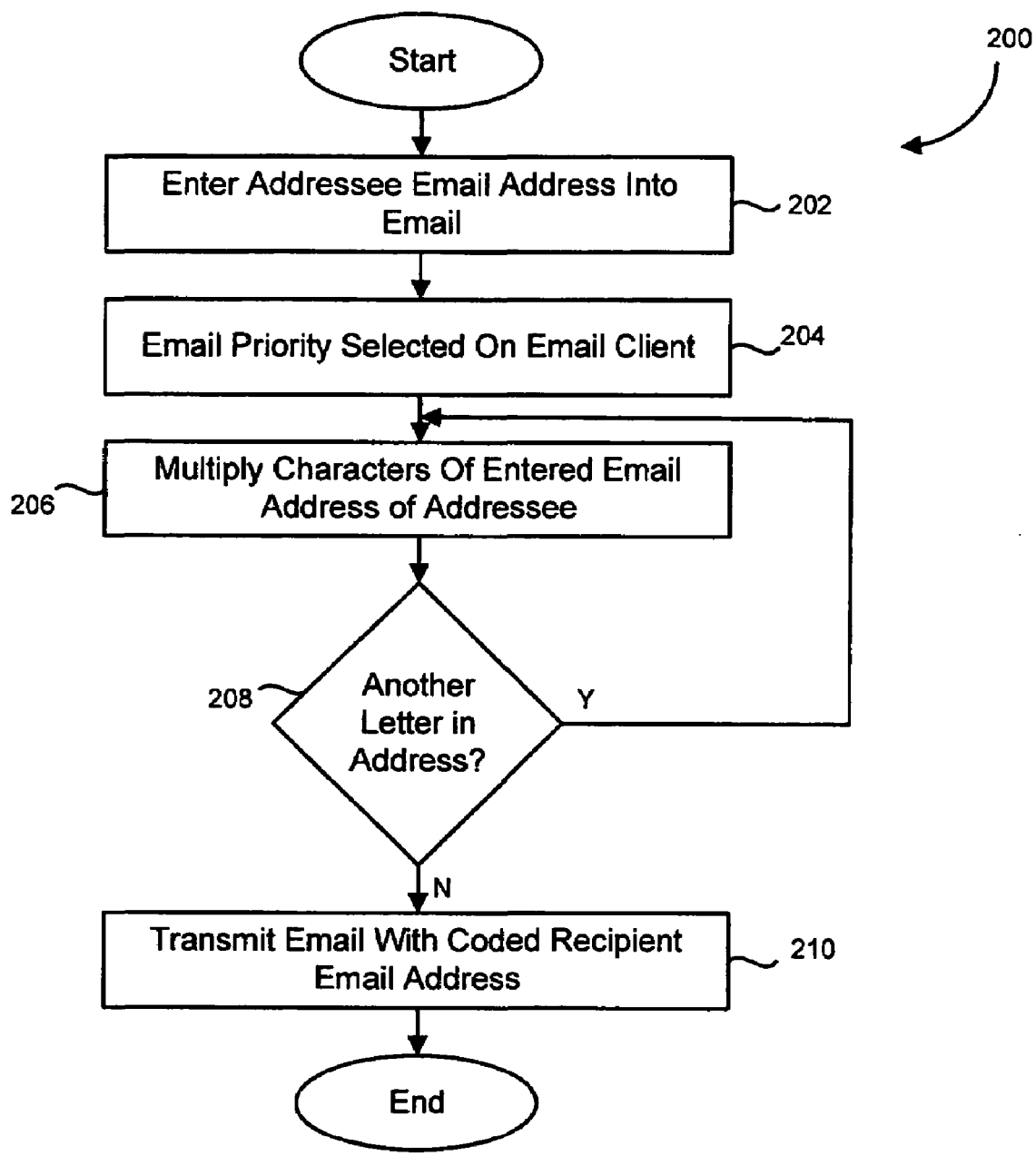
FIG. 2 illustrates a block flow diagram of an embodiment of the coding and prioritizing process of the method for prioritizing email and controlling spam.
Figure 4:
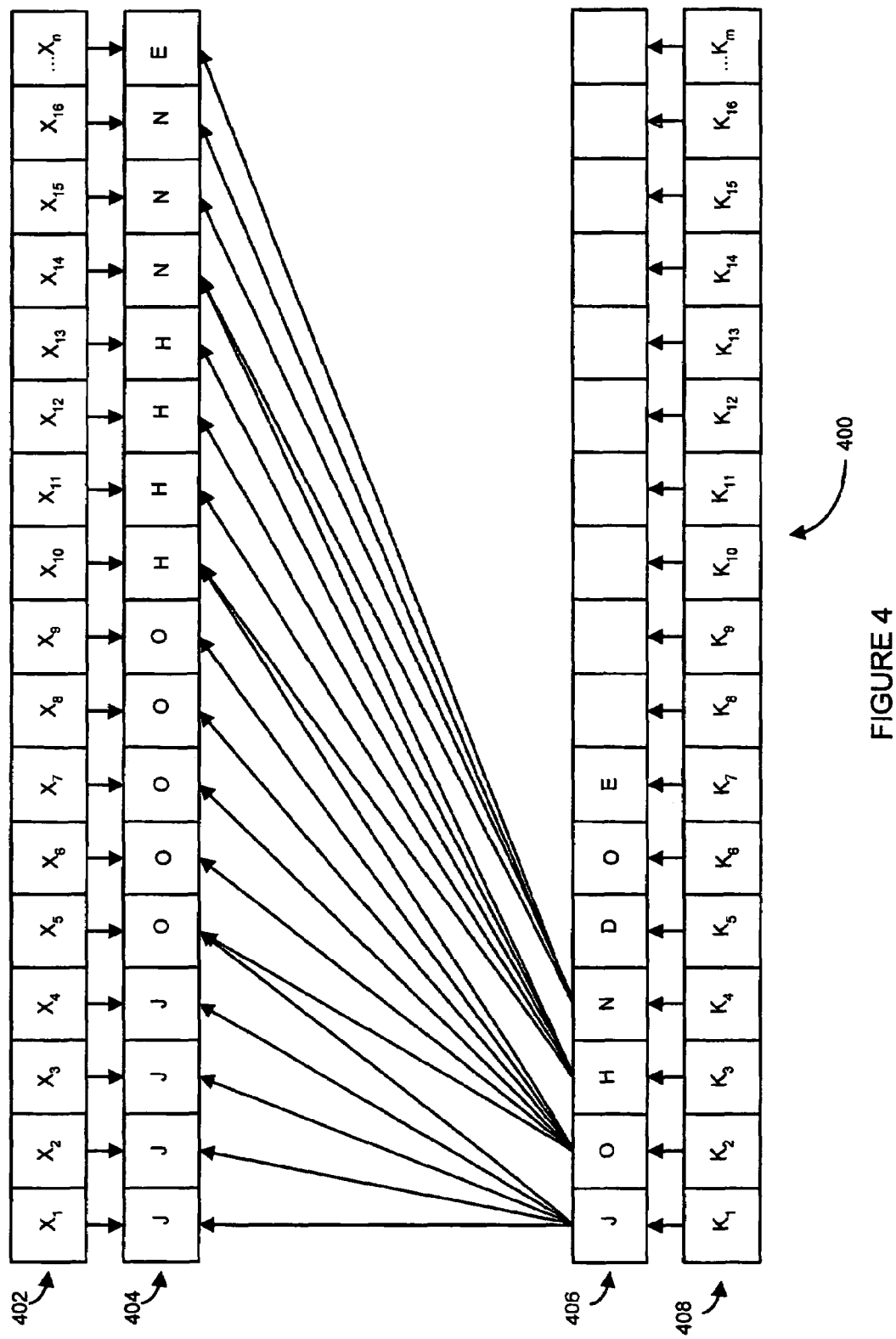
FIG. 4 illustrates an embodiment of a stored email address and a coded email address of the method for prioritizing email and controlling spam.

Turning to FIGS. 2 and 4, one embodiment of the present system and method for prioritizing email and controlling spam 100 is illustrated. FIG. 2 depicts a block flow diagram of an embodiment 200 for a method of coding and prioritizing an email. In step 202, a user composes an email, including entering the email address of the addressee in the email. In step 204, the user selects, using their email client 108, the desired priority of the email to be sent to the addressee. The higher the priority the greater the number of repetitions a particular or all characters of the addressee's email address will be repeated. This repetition typically will increase the costs associated with sending the email. Due to the expense associated with coding tens of thousands or millions of characters of an email address with the coder/decoder 124, a spammer will likely not choose to prioritize their messages using the present system 102. In step 206, the coder/decoder 124 takes the first character and repeats that character based on the priority selection made by the sender up to any number.

FIG. 4 depicts an embodiment 400 of a stored email address and a coded email address of the method for prioritizing email and controlling spam. In FIG. 4, the user name "johndoe" is shown in the coded received email address 404 with the first character "j" of the user name "johndoe" repeated four times. In another example, this repetition of this character or any other character in the email address could be as high as several thousand. Received variable string 402 contains received character variables "$X_1$," "$X_2$," etc. that correspond to individual characters of the received email address 404. For example, the received character variable "$X_1$" equals the character "j" of the received email address 404, the received character variable "$X_2$" equals the character "j" of the received email address 404, the received character variable "$X_{11}$" equals the character "h" of the received email address 404, etc. In one aspect, the user name is coded and in another aspect, the user name, "@" symbol, and domain name are coded. In the present example as shown in FIG. 4, the user name, "johndoe," is coded.

FIG. 4 also depicts the stored email address 406, which shows the exemplary stored email address for "johndoe." As note above, the stored email address can contain any or all characters of an email address. Stored variable string 408 contains stored character variables "$K_1$," $K_2$," "$K_3$," etc. that correspond to individual characters, such as "j," "o," "h," etc., of the stored email address 406. For example, the stored character variable "$K_1$" equals the character "j" of the stored email address 406, the stored character variable "$K_2$" equals the character "o" of the stored email address 406, the stored character variable "$K_3$" equals the character "h" of the stored email address 406, etc. The "K" variable equals the "$_m$th" character, letter, or symbol of the stored email address of the addressee. In this example, if the coded email address was the entire email address, such as "johndoe@yyy.com," then the "@" character of the stored email address 406 would equal stored character variable "$K_8$" of the stored variable string 408, and the first character "y" of the stored email address 406 would equal the stored character variable "$K_9$" of the stored variable string 408.

In one aspect, the coding of the user name takes place at the coder/decoder 124 of the user's email server 112. As mentioned above, computer instructions or software perform the coding operation of repeating these characters based on the priority as selected by the user. The coder/decoder 124 communicates with the SMTP servers 116 and 120 and POP3 servers 118 and 122 of the email servers 112 and 114. In addition, the coder/decoder 124 may operate within the email clients 108 and 110. In step 208, the method for prioritizing emails 200 inquires whether there is another character in the email address as entered by the user. In step 210, the method for prioritizing emails 200 completes the coding operations and transmits the email to the addressee as noted above.

Figure 3:
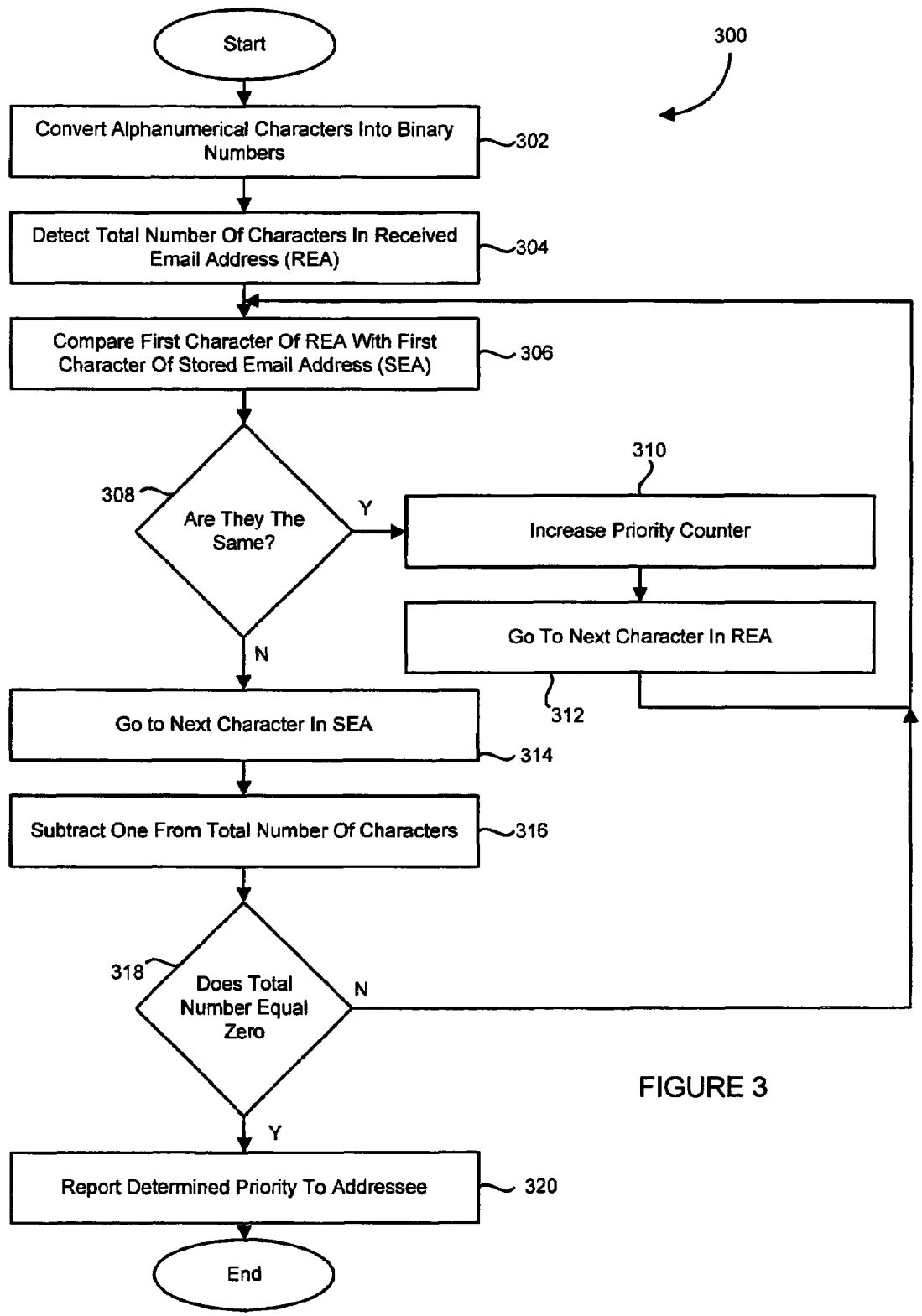
FIG. 3 illustrates a block flow diagram of an embodiment of the decoding and prioritizing process of the method for prioritizing email and controlling spam.

FIG. 3 depicts a block flow diagram of an embodiment 300 for a method of decoding and prioritizing an email. In step 302, the coder/decoder 124 loads the memory with the received email address 404 and converts the alphanumerical characters of the received email address 404 into binary numbers. In step 304, the total number of characters of a stored email address 406 that has been coded is determined. In addition, in step 304, the total number of characters of the stored email address, retrieved from the addressee's email client 110, is determined. For example, if the portion of the stored email address 406 that is coded is "johndoe," then the total number of characters is seven. Further, if the entire stored email address 406 that is coded is "johndoe@yyy.com," then the total number of characters is fifteen. The total number of characters may be stored in a register or memory of the coder/decoder 124 for use when decoding and prioritizing the email as described below.

In step 306, a comparison is made between the first character of the received email address 404 and the stored email address 406. In one embodiment, this comparison is achieved by subtracting the binary number of the converted first character of the received email address 404 and the binary number of the converted first character of the stored email address 406. In step 308, if the sum equals zero, then the characters are the same and the coder/decoder 124 proceeds to step 310; if they are not, then it proceeds to step 314. In another aspect, the comparison operation of step 306 may be performed according to other such commonly known operations as found in the computer programming or software arts, such as common algorithms of comparing the characters as they are received without converting them to binary number format.

In step 310, the priority counter is increased one per every repetition of a character found in the received email address 404. For example, if the coded received email address 404 contains 900 first characters; then the priority counter will increase to 900. In step 312, the coder/decoder 124 goes to the next subsequent character in the received email address 404 and the comparison is repeated in steps 304, 306, and 308 until the characters of the received email address 404 and the stored email address 406 are different. If they are different, then in step 314 the coder/decoder 124 goes to the next character in the stored email address 406.

In step 316, one is subtracted from the total number of characters of the stored email address 406 determined in step 304. For example, if the total number of characters of the stored email address 406 is seven, then in step 316 one is subtracted from seven for a sum of six. Meaning there exists six more characters of the stored email address 406 to compare. This process is repeated until in step 318, the total number of characters equals zero. In step 320, the determined priority from step 310 is reported to the addressee.

The following examples are based on published estimates that the cost of sending an email is approximately 0.01 cent each. In addition, it is estimated that the cost of repeating an email address according to the present system and method for prioritizing email and controlling spam is 0.001 cent each repetition.

PROPHETICAL EXAMPLE 1.

A distributor of watches sends an email to one million persons at a cost of 0.01 cent per each email. The total cost of sending these emails is $100. [1,000,000 emails*0.01 cent/email]

PROPHETICAL EXAMPLE 2

A school board wants to send a notice to 650 households in the community. In order to attract attention, the board repeats the email addresses of these households ten thousand times according to the present system and method for prioritizing email and controlling spam. The total cost for coding the emails is $65 and the cost for sending the emails is 0.065 cents. Thus, the total costs for sending these emails is approximately $65. [650 emails*0.001 cent/email+650 emails*0.01 cent/email]

PROPHETICAL EXAMPLE 3.

The distributor in Prophetical Example 1 is disappointed with the response of his first mailing. Therefore, he decides to send a follow-up message to all one million persons, but this time he does so according to the present system and method for prioritizing email and controlling spam. The distributor repeats the characters of each addressee ten thousand times at a cost of 0.001 cent for each repetition. The total cost for this mailing is calculated in the following manner. The total cost for sending the emails is $100 [1,000,000 emails*0.01 cent/email]. The total costs for coding these emails is $100,000. [1,000,000 emails*10,000 repetitions*0.001 cent/email]. The combined costs for this mailing is $100,100.

Therefore, the present system and method for prioritizing email and controlling spam would be very effective to prevent spammers from transmitting email according to this invention.

Although there has been described what is at present considered to be the preferred embodiments of the present system and method for prioritizing email and controlling spam, it will be understood that the apparatus and methods can be embodied in other specific forms without departing from the spirit or essential characteristics thereof. For example, the functions of the coder/decoder as described herein can be stored and operated remotely on different servers and machines than those described herein. The present embodiments are, therefore, to be considered in all aspects as illustrative and not restrictive. The scope of the invention is indicated by the appended claims rather than the foregoing description.

What is claimed:

1. A system for prioritizing email and controlling spam comprising:

means for establishing a connection on a network between a sender's email client connected to an email-sending server and an addressee's email client connected to an email-receiving server, wherein said email-sending server and said email-receiving server utilize a common email system protocol to send an email on said network;

means for selecting on said sender's email client an addressee's email address and a desired priority for said email to be sent to said addressee;

means for coding said addressee's email address of said email by taking a first character of said addressee's email address and repeating said first character a corresponding number of times to reflect said selected priority;

means for sending, via said common email system protocol, said coded email from said email-sending server to said email-receiving server;

means for receiving, via said common email system protocol, said email at said addressee's email server from said email-sending server;

means for decoding said email address of said email by comparing said first character of said coded email address with a stored email address for said addressee; and means for determining said selected priority at said addressee's email client based on the repetitions of said first character of said addressee's email address.

2. The system of prioritizing an email and controlling spam of claim 1 further comprising:

means for storing said prioritized email in a prioritized inbox for viewing by said addressee.

3. The system of prioritizing an email and controlling spam of claim 2 further comprising:

means for storing said email in a non-prioritized inbox for viewing by said addressee when no priority was determined.

4. The system of prioritizing an email and controlling spam of claim 1 wherein said means for coding further comprises:

means for taking a second character of said addressee's email address and repeating said second character a desired number of times to reflect said selected priority.

5. The system of prioritizing an email and controlling spam of claim 4 wherein said means for determining further comprises:

means for determining a higher priority for said email based on said number of repetitions of said first and said second characters of said addressee's email address.

6. The system of prioritizing an email and controlling spam of claim 1 wherein said means for decoding comprises:

means for storing said stored email address on said addressee's email client.

7. The system of prioritizing an email and controlling spam of claim 1 wherein said means for decoding comprises:
means for retrieving said stored email address from said addressee's email client.

8. The system of prioritizing an email and controlling spam of claim 1 wherein said means for coding comprises:
means for coding said addressee's email address at said sender's email client.

9. The system of prioritizing an email and controlling spam of claim 1 wherein said means for coding comprises:
means for coding said addressee's email address at said sender's email server.

10. The system of prioritizing an email and controlling spam of claim 1 wherein said means for decoding comprises:
means for decoding said addressee's email address at said addressee's email client.

11. The system of prioritizing an email and controlling spam of claim 1 wherein said means for decoding comprises:
means for decoding said addressee's email address at said addressee's email server.

12. A method for prioritizing email and controlling spam, comprising the steps of:
establishing a connection on a network between a sender's email client connected to an email-sending server and an addressee's email client connected to an email-receiving server, wherein said email-sending server and said email-receiving server utilize a common email system protocol to send an email on said network;
selecting on said sender's email client an addressee's email address and a desired priority for said email to be sent to said addressee;
coding said addressee's email address of said email by taking a first character of said addressee's email address and repeating said first character a corresponding number of times to reflect said selected priority;
sending said coded email from said email-sending server to said email-receiving server;
receiving, via said common email system protocol, said email at said addressee's email server from said email-sending server;
decoding said email address of said email by comparing said first character of said coded email address with a stored email address for said addressee; and
determining said selected priority at said addressee's email client based on the repetitions of said first character of said addressee's email address.

13. The method of prioritizing an email and controlling spam of claim 12 further comprising the step of:
storing said prioritized email in a prioritized inbox for viewing by said addressee.

14. The method of prioritizing an email and controlling spam of claim 13 further comprising the step of:
storing said email in a non-prioritized inbox for viewing by said addressee when no priority was determined.

15. The method of prioritizing an email and controlling spam of claim 12 wherein said step of coding further comprises:
taking a second character of said addressee's email address and repeating said second character a desired number of times to reflect said selected priority.

16. The method of prioritizing an email and controlling spam of claim 15 wherein said step of determining further comprises:
determining a higher priority for said email based on said number of repetitions of said first and said second characters of said addressee's email address.

17. The method of prioritizing an email and controlling spam of claim 12 wherein said step of decoding comprises:
storing said stored email address on said addressee's email client.

18. The method of prioritizing an email and controlling spam of claim 12 wherein said step of decoding comprises:
retrieving said stored email address from said addressee's email client.

19. The method of prioritizing an email and controlling spam of claim 12 wherein said step of coding comprises:
coding said addressee's email address at said sender's email client.

20. The method of prioritizing an email and controlling spam of claim 12 wherein said step of coding comprises:
coding said addressee's email address at said sender's email server.

21. The method of prioritizing an email and controlling spam of claim 12 wherein said step of decoding comprises:
decoding said addressee's email address at said addressee's email client.

22. The method of prioritizing an email and controlling spam of claim 12 wherein said step of decoding comprises:
decoding said addressee's email address at said addressee's email server.

* * * * *